US009480205B2

(12) United States Patent
Naeyaert et al.

(10) Patent No.: US 9,480,205 B2
(45) Date of Patent: Nov. 1, 2016

(54) COMBINED PACKER AND STUFFER MEANS

(71) Applicant: CNH Industrial America LLC, New Holland, PA (US)

(72) Inventors: Karel Naeyaert, Oostkamp (BE); Dirk A. R. Vandamme, Uitkerke (BE); Johan A. E. Vande Ryse, Brugge (BE); Bram Rosseel, Snellegem (BE)

(73) Assignee: CNH Industrial America LLC, New Holland, PA (US)

( * ) Notice: Subject to any disclaimer, the term of this patent is extended or adjusted under 35 U.S.C. 154(b) by 70 days.

(21) Appl. No.: 14/362,853

(22) PCT Filed: Dec. 3, 2012

(86) PCT No.: PCT/EP2012/074244
§ 371 (c)(1),
(2) Date: Jun. 4, 2014

(87) PCT Pub. No.: WO2013/083519
PCT Pub. Date: Jun. 13, 2013

(65) Prior Publication Data
US 2014/0366752 A1    Dec. 18, 2014

(30) Foreign Application Priority Data
Dec. 4, 2011    (BE) .................................... 2011/0702

(51) Int. Cl.
*A01F 15/10*    (2006.01)
(52) U.S. Cl.
CPC ............. *A01F 15/10* (2013.01); *A01F 15/101* (2013.01); *A01F 2015/102* (2013.01)

(58) Field of Classification Search
CPC .......... A01F 15/101; A01F 2015/102; A01F 15/10; A01D 43/06; A01D 43/006
USPC ................... 100/7, 179, 188 R, 189; 56/341
See application file for complete search history.

(56) References Cited

U.S. PATENT DOCUMENTS

| | | | |
|---|---|---|---|
| 2,854,809 A | 10/1958 | Starrett et al. | |
| 3,115,088 A | 12/1963 | McDuffie | |
| 3,374,729 A | 3/1968 | May et al. | |
| 3,706,273 A | 12/1972 | Crawford | |
| 4,120,241 A | 10/1978 | Smith et al. | |
| 4,372,104 A | 2/1983 | Simonis et al. | |
| 4,569,282 A * | 2/1986 | Galant ..................... | A01F 15/04 100/189 |
| 4,604,858 A * | 8/1986 | Esau ....................... | A01F 15/04 100/179 |
| 4,656,938 A * | 4/1987 | Webb ..................... | A01F 15/101 100/189 |
| 5,467,702 A * | 11/1995 | Naaktgeboren ........ | A01D 90/02 100/142 |
| 5,768,872 A | 6/1998 | Von Allwoerden | |
| 5,842,335 A * | 12/1998 | Esau ....................... | A01F 15/10 100/189 |
| 5,937,746 A | 8/1999 | Jonckheere et al. | |
| 6,385,952 B1 | 5/2002 | Bergkamp et al. | |
| 8,561,532 B2 | 10/2013 | Bergmann | |

FOREIGN PATENT DOCUMENTS

| | | |
|---|---|---|
| DE | 333419 C | 2/1921 |
| EP | 0508186 A1 | 10/1992 |
| EP | 1769674 A1 | 4/2007 |

(Continued)

*Primary Examiner* — Jimmy T Nguyen
(74) *Attorney, Agent, or Firm* — Patrick M. Sheldrake (57) ABSTRACT

An agricultural baler of the rectangular type has a feeder of which the movement is directly derived from and synchronized with the movement of the reciprocating plunger.

12 Claims, 9 Drawing Sheets

(56) References Cited

FOREIGN PATENT DOCUMENTS

| | | | |
|---|---|---|---|
| FR | 2863821 A1 | 6/2005 |
| GB | 625679 A | 7/1949 |
| GB | 846393 A | 8/1960 |
| GB | 1109225 A | 4/1968 |
| GB | 2219967 A | 12/1989 |
| NL | 1037453 C | 5/2011 |

\* cited by examiner

COMBINED PACKER AND STUFFER MEANS

This application is the U.S. National Stage filing of International Application Serial No. PCT/EP2012/074244 filed on Dec. 3, 2012 which claims priority to Belgian Application BE2011/0702 filed Dec. 4, 2011, each of which is incorporated herein by reference in its entirety.

INTRODUCTION

This invention relates generally to agricultural balers for the formation of bales of crop material such as hay, straw or silage in a baling chamber, and more specifically to balers of the rectangular type, i.e. balers which produce bales of crop material which are rectangular in shape. In particular, the invention is concerned with the feeder means for the transportation of said material into the feeder duct and from within the feeder duct into the baling chamber.

DESCRIPTION OF THE PROBLEM

An agricultural baler of basically conventional design generally comprises:
a wheeled frame;
a baling chamber mounted to said frame and extending generally fore-and-aft with respect to the intended direction of movement of the baler and having an inlet opening in the lower wall thereof;
compression means, in particular a plunger, mounted for reciprocation within the baling chamber and back-and-forth over the inlet opening therein for compressing successive charges of crop material fed through said inlet opening into said baling chamber to form a bale thereof; the compression means reciprocate at least partly, preferably completely, over the inlet opening therein;
feeder means, comprising a feeder fork with feeder tines; in one embodiment, the feeder means are movably mounted, as seen with respect to the radius of curvature of the feeder duct, inwardly of the inner wall means and extending through slots into the feeder duct; said feeder means, in particular said tines, are cooperable with the feeder duct to feed crop material into said feeder duct for accumulating a charge of said crop material therein and/or for stuffing said charge of said crop material into the baling chamber; the entry point of the feeder means is located in the lower end of the upper wall means;
a feeder duct, also called a precompression chamber, communicating at one end with the inlet opening in the baling chamber and curving downwardly and forwardly there from and terminating in a lower, forwardly facing open crop receiving mouth; this feeder duct comprising upper and lower curved wall means of which the upper wall means comprises slots, extending generally from said crop receiving mouth to said inlet opening in the baling chamber for cooperation with said tines. In one embodiment, a feeder duct may be formed by transversely spaced apart elongated wall members defining slots there between.

In such baler, as disclosed in EP 0 636 308 B1, the feeder means comprise a drive shaft, operably driven by the gear box, at least one crank arm fixed to said drive shaft and a fork assembly comprising tines moving with a predetermined speed course along a predetermined path relative to said duct for cyclic engagement of said crop material in said feeder duct and conveyance of charges thereof to said inlet opening in the baling chamber, and at least one fork lever rotably coupled to said crank arm and operably supported by guide means. Hay, straw, silage or similar crop material that has been previously cut, windrowed or swathed, is picked up from the ground by a pick-up unit and fed into a duct by a first set of feeder means, a packer unit. The packer unit precompresses the crop material in the duct against a backstop formed by the plunger, when closing off the entrance of the baling chamber. Subsequently, successive batches or charges are loaded into an elongated baling chamber by tines of second set of feeder means, a stuffer unit, in timed sequence with a reciprocating plunger. The plunger compresses the material into bales and, at the same time, gradually advances the bales towards the outlet of the baling chamber. As the bales reach a predetermined length as determined by a metering device, a knotter device is actuated which wraps cord, twine or other flexible binding material around the bale and secures the ends of the binding material together.

The stuffer unit is configured to quickly load charges of said crop material into the baling chamber within the short interval during which the reciprocating plunger clears the entrance of the baling chamber. Typically, this task is accomplished by a fork assembly whereof the arms are rotably connected to cranks, said arms being provided with longitudinally extending slots in which stationary journals are received. A uniform revolution of the cranks makes the arms shift along and pivot about the journals so that the tines of the fork travel along a generally kidney-shaped path with a varying speed. The maximum or peak speed is obtained when the distance between the connection to the cranks and the stationary journals reaches its minimum, since the arms then act as levers with very close fulcrum points. Such system permits a quick sweep of the material behind the packer unit through the duct and to the entrance of the baling chamber. The action of the stuffer unit is initiated by, for example, a trip sensor positioned in the feeder duct. The stuffer unit according to EP 0 636 308 B1 is typically a one-revolution mechanism, i.e. one complete revolution of the crank driving the stuffer fork assembly corresponds to one sweep of the stuffer fork assembly timed with one reciprocal movement of the compression means.

This type of stuffer unit was originally designed for the baling of dry, low density material such as straw or hay, and to a lesser extent for the bailing of silage grass which has a higher humidity and a higher density than the other crop materials, such that the load on the components of the stuffer unit increases accordingly. After investigation of the stuffer mechanism in EP 0 636 308 B1, it was established that the system still has a too large deceleration at the end of the stuffer stroke (as illustrated in FIG. 15 of EP 0 636 308 B,), which results in a lot of energy being released at one particular point in the stuffer cycle. Hence, the pivot points of the system need to handle a high load and are prone to mechanical failure. Furthermore, it was observed that too heavy slices are sometimes not transported up into the baling chamber, especially with the baling of silage. Consequently, a stuffer overload protection will be triggered by the forces which occur during the baling of silage. A conventional protection is the use of a shear bolt assembly in the drive line of the stuffer unit. When the loads exceed the shear force of the bolt, the stuffer is disconnected before its components are damaged, but it will cost the operator valuable time to render the baler operable again, also because it may be required to clear the duct manually before the baler can be restarted.

The inventors have now developed a novel feeder mechanism to solve at least partly the aforementioned problems. In particular, said novel feeder mechanism exhibits a more evenly divided acceleration during the predetermined speed course along a predetermined path relative to said duct.

Furthermore, the inventors have provided a novel feeder mechanism combining the operations of a packer and stuffer unit into one single feeder unit.

BACKGROUND PRIOR ART

A feeder mechanism combining the operations of a packer and stuffer unit into one single feeder unit has been described in the prior art.

EP 0 508 186 (Fortschritt Erntemaschinen, 1992) discloses feeder means comprising a rotary conveyor belt carrying tines which conveyor trajectory can be altered, matched in time with the movement of the compression means, by an assembly comprising a coupler, follower crank and control crank, driven by the crank drive.

U.S. Pat. No. 5,768,872 (Same Deutz-Fahr, 1998) discloses feeder means comprising a rotary conveyor belt carrying tines which conveyor trajectory can be altered, matched in time with the movement of the compression means, by an hydraulic element into a packer and stuffer trajectory.

EP 1 769 674 (Usines CLAAS France, 2007) discloses a crank-arm controlled feeder means comprising feeder tines and a feeder transmission between the crank drive and the feeder tines and having at least one telescopic transmission member which produces a movement of the feeder tines for switching over from a packing stroke (pre-stroke) to a stuffing stroke (filling stroke), and wherein a retaining device, preferably a telescopic coupling member, is associated at least with the feeding transmission.

WO 2011/053122 (Lely Patent, 2011) discloses feeder means comprising an arm supporting feeder tines which arm can be moved along a packing trajectory (stuffing trajectory A) and a stuffing trajectory (load trajectory B), wherein said arm is movable by a first driving device to at least move the tines in an out of the feeder duct and wherein said arm is pivotably supported by a fulcrum, the fulcrum being displaceable to selectively move the arm along a packing or stuffing trajectory by a second driving device which is mechanically independent of the reciprocing mechanism to move the arm along a packing or stuffing trajectory.

DESCRIPTION OF THE INVENTION

It is an object of the present invention to present a solution to overcome the aforementioned problems in such manner that the forces of the crop material on the feeder means are reduced substantially, without negatively affecting the proper stuffing of the crop material from the feeder duct into the baling chamber of a baler of the rectangular type.

It is a further object of the present invention to provide a feeder mechanism, suitable for use in an agricultural baler, which combines the operations of a packer and stuffer unit into one single feeder assembly.

This solution is obtained by the agricultural baler and the feeder means as defined in the appended claims.

In particular, an agricultural baler of the rectangular type is provided comprising feeder means, characterized in that:
the movement of the feeder means is directly derived from and synchronized with the movement of the reciprocing compression means; and
the feeder means comprise a feeding fork comprising at its rearmost end for cooperating with the feeder duct a series of laterally spaced-apart elongated feeder tines, and at its other rearmost end being rotably coupled with a pair of cranks through pivots, which cranks are rotably coupled to the compression means, in particular a plunger, and wherein the fulcrum of the feeder fork is rotably coupled to one rearmost end of a spacer rod, which spacer rod is rotably coupled in a pivot point at its other rearmost end to the baler frame.

According to one embodiment, an agricultural baler is provided, characterized in that the crank is pivotally connected either to the pivot point of the pitman arm or to pivot point on the reciprocing compression means, in particular a plunger other than the pivot point.

According to one embodiment, an agricultural baler is provided, characterized in that the position of the feeder tines relative to the feeder duct is determined by the relative positions of the crank, feeder fork and spacer rod, operably connected through pivots and fulcrum.

According to one embodiment, an agricultural baler is provided, characterized in that the feeder tines may describe a trajectory in and outside the feeder duct which is partly at the lower end in the feeder duct, the packer trajectory, or partly at the upper end in the feeder duct, the stuffer trajectory.

According to one embodiment, an agricultural baler is provided, characterized in that the packer trajectory consists of two parts, a packer stroke, designated P, with a duration of half of the reciprocating movement of the compression means, and a rest stroke, designated R, with a duration of half of the reciprocating movement of the reciprocing compression means.

According to one embodiment, an agricultural baler is provided, characterized in that the stuffer trajectory consists of two parts, a packer stroke, designated P, with a duration of half of the reciprocating movement of the compression means, and a stuffer stroke, designated S, with a duration of half of the reciprocating movement of the reciprocing compression means.

According to one embodiment, an agricultural baler is provided, characterized in that the switch-over from packer to stuffer trajectory is controlled by the relative rotational position of the spacer rod.

According to one embodiment, an agricultural baler is provided, characterized in that the spacer rod is configured as a single revolution clutch assembly.

According to one embodiment, an agricultural baler is provided, characterized in that the clutch may be triggered by a sensor mechanism, in particular a trip sensor in the feeder duct.

The invention also pertains to feeder means, suitable for use in an agricultural baler, comprising a feeding fork comprising at its rearmost end for cooperating with a feeder duct a series of laterally spaced-apart elongated feeder tines, and at its other rearmost end being rotably coupled with a pair of cranks through pivots, which cranks are rotably coupled to reciprocing compression means, and wherein the fulcrum of the feeder fork is rotably coupled to one rearmost end of a spacer rod, which spacer rod is rotably coupled in a pivot point at its other rearmost end to a frame, the movement of the feeder means being directly derived from reciprocing compression means.

The invention also pertains to a method for reducing peak velocities of feeder means of an agricultural baler along a feeder trajectory, especially along a stuffer trajectory, using the feeder means according to the invention, wherein the feeder trajectory may be either a packer or a stuffer trajectory, and the packer and stuffer trajectories may be combined and iterated at will.

DESCRIPTION OF THE FIGURES

FIG. 14(a, b) is a diagram of the position, speed and acceleration courses of the feeder system from the prior art (similar to EP 0 636 308 B1, FIG. 15) and the feeder system according to the invention.

The following reference numbers are used throughout the text and Figures:

1 baler
10 baling chamber
14 struts
18 tongue
20 plunger
21 pivot on plunger 20
22 inlet of baling chamber 10
24 floor of baling chamber 10
25 wheeled frame
26 feeder duct
28 upper discharge end of feeder duct 26
30 lower receiving end of feeder duct 26
32 upper wall means of feeder duct 26
36 lower wall means of feeder duct 26
37 trip mechanism and pressure sensor
44 auger
52 power input shaft
55 pitman arm
56 gearbox
57 pivot point of pitman arm 55
58 crank arm
59 pivot point of crank arm 58
60 feeder means
61 fulcrum of feeder fork 66
62 pivot point of spacer rod 63
63 spacer rod
64 strut
66 feeder fork
70 feeder tines
74 crank
76 pivot point of crank 74
100 path of feeder tines

DETAILED DESCRIPTION OF THE INVENTION

An agricultural baler in accordance with the present invention will now be described in greater detail, by way of example, with reference to certain embodiments and to certain figures, but the present invention is not limited thereto, but only by the claims.

In the following description and claims, right and left hand references are determined by standing at the rear of the machine and facing in a direction of forward travel. Also, in the following description and claims, it is to be understood that terms such as "front", "rear", "forward", "rearward", "left", "right", "upward", "downward", "upper", "lower", "inner", "outer", etc. as used throughout this application, are determined with respect to the normal mode of operation or direction of travel of the baler in operation and in its normal orientation unless otherwise stated. The aforementioned terms are not to be construed as limiting terms.

Figure 1:
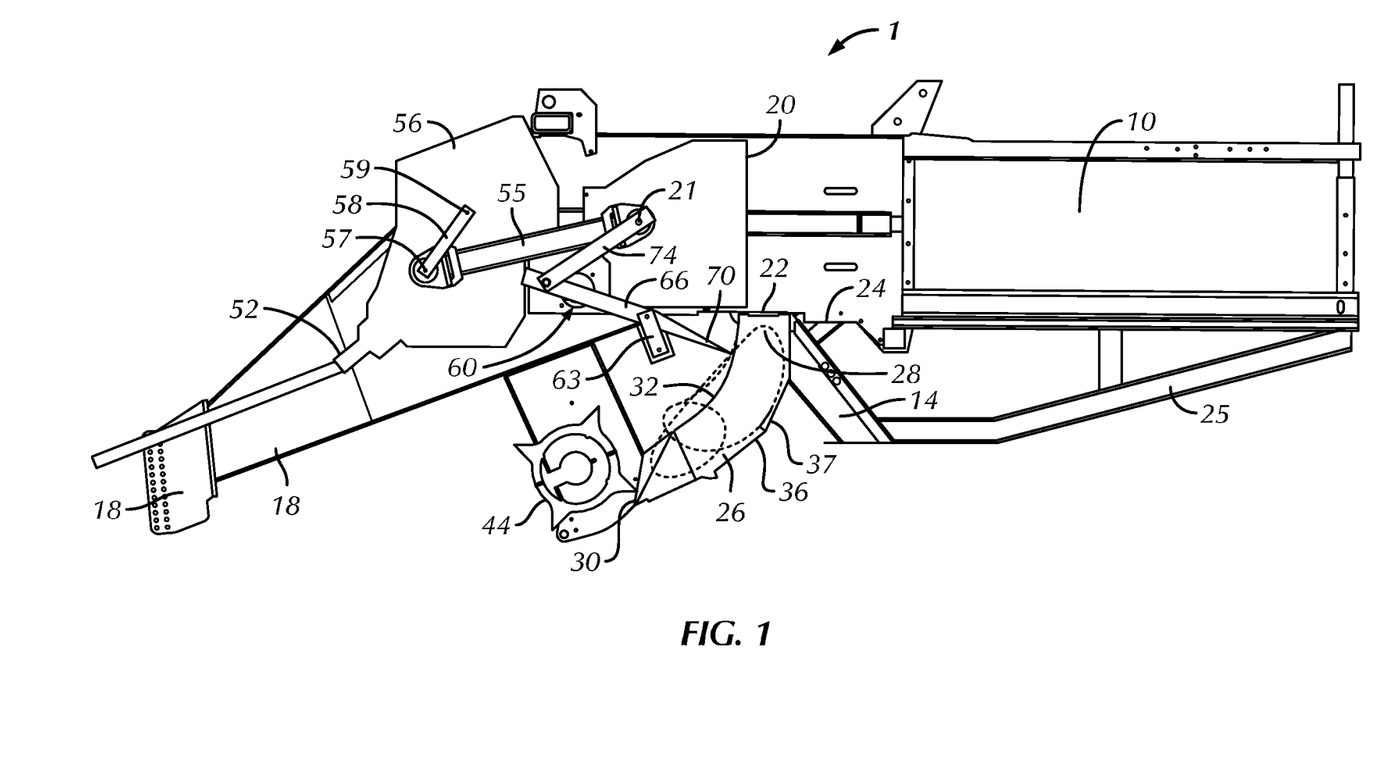
FIG. 1 is a side view of an agricultural baler in which an embodiment of the present invention may be applied.

In FIG. 1, a baler 1 is illustrated having a fore-and-aft extending baling chamber 10 with a rectangular cross section defining the baling chamber. The baling chamber 10 is supported in an upwardly and forwardly inclined manner by struts 14 having ground-engaging wheels (not shown) at their lowermost ends. A downwardly and forwardly projecting tongue 18 at the front of the baling chamber 10 is adapted for hitching the baler 1 to a towing vehicle (not shown) for advancing the same across a field. An enclosed plunger 20 reciprocates fore-and-aft within the baling chamber for periodically compacting material presented to the chamber through an inlet 22 in the floor 24 of baling chamber 10 across the full width thereof.

An upwardly curving feeder duct 26 depends from the baling chamber 10 and has its upper discharge end 28 in registration with the inlet 22, while the lower receiving end 30 of the feeder duct 26 is remote from the inlet 22 and is disposed substantially forwardly thereof. The feeder duct 26 has a curved upper wall 32 which is provided with laterally spaced, longitudinal slots (not shown) extending the full length thereof, and a solid curved lower wall 36.

The lower end 30 of the feeder duct is positioned directly behind a crop pick-up (not shown) which may be of any design capable of picking up windrowed or swathed crop material from the field and delivering the same rearwardly to at least two augers 44 which gather the crop centrally and deliver it rearwardly into the lower end 30 of the feeder duct 26.

A power input shaft 52 is coupled to a right angle gearbox 56. The gearbox 56 drives a pair (one at each side of the gearbox, symmetrically mirrored) of crank arms 58 which are rotably linked to a pair of pitman arms 55. The pitman arms 55 engage at one end thereof with the crank arms 58 in the pivot point 57 and at the other end with the plunger 20 in the pivot point 21. When rotating power from the towing vehicle is supplied to the power input shaft 52, the gearbox 56 rotates the crank arms 58 around the pivots 59 to thereby reciprocate the plunger 20 within the baling chamber 10. Other output shafts (not shown) of the gearbox 56 provide either directly or indirectly driving power to e.g. the crop pick-up (not shown) and the stub augers 44.

Feeder means 60 according to the invention derive their movement directly from the reciprocing plunger 20 and is synchronized therewith. As can also be seen in more detail in FIGS. 2 to 9, the feeder means 60 comprise a feeding fork 66, for periodically sweeping an accumulated charge of crop material from the feeder duct 26 into the baling chamber 10, comprising at its rearmost end cooperating with the feeder duct 26 a series of laterally spaced-apart elongated feeder tines 70. The feeder tines 70 are spaced apart in accordance with the slots in the upper wall 32 of feeder duct 26, such that during the feeder cycle the feeder tines 70 may enter the feeder duct 26 through said slots and move along the bottom wall 36 toward the inlet 22 of the baling chamber 10 along a predetermined path of the feeder tines 100.

The feeding fork 66 is at its other rearmost end rotably coupled with a pair of cranks 74 through pivots 76. The cranks 74 are at one rearmost end rotably coupled to the feeder fork 66, and at the other rearmost end rotably coupled to the plunger 20 and the pitman arms 55 in pivot points 21. In this way, the feeder fork 71 and crank 74 are suspended from the pivot point 21 in a rigid double-pendulum arrangement, the first pendulum being the crank 74, the second pendulum being the feeder fork 66.

The fulcrum 61 of the feeder fork 66 is rotably coupled to one rearmost end of a spacer rod 63, which spacer rod 63 is rotably coupled in a pivot point 62 at its other rearmost end to the baler frame 25, e.g. on strut 64. The position of the pivot point is meant to be fixed relative to the feeder fork as the lift forces of the feeder fork are considerable high. The position of the feeder tines 70 relative to the feeder duct 26 is determined by the relative positions of the crank 74, feeder fork 66 and spacer rod 63. The crank 74, feeder fork 66 and spacer rod 63 are operably connected through pivots and fulcrum (21, 76, 61, 62) working together to make the feeder tines describe the packer and stuffer trajectories. The lengths of the members (74, 66, 63) of the feeder means, as well as the position of the pivots and fulcra (21, 76, 61, 62) are all selected to perform the functions and predetermined trajectories as described below and may be chosen by the skilled person upon routine experimentation and depending on the actual design of the baler. It is essential to the invention that the cranks 74 are connected to the plunger 20 by a pivot such that movement of the members (74, 66, 63) of the feeder means and the trajectory of the feeder tines 70 is derived only from the movement of the reciprocing plunger 20 and is synchronized therewith. Hence, the movement of the feeder means 60 according to the invention is solely and only derived from the movement of the reciprocing plunger without any secondary devices as disclosed in the prior art, such as, for instance an hydraulic piston to move feeder tines from one trajectory into the other trajectory and back.

As an alternative embodiment, the crank 74 may be pivotally suspended from a point on the plunger other than the pivot point 21.

With the arrangement according to the invention, a full 360 degrees rotation of the spacer rod 63 around its pivot point 62 corresponds to half of a full reciprocal movement of the compression means ; hence one full reciprocal movement of the compression means corresponds to two full 360 degrees rotation of the spacer rod 63.

Compared to the prior art feeding unit, the feeding unit according to the invention does not comprise elements such as elongated slots, sliding journals, sprockets and/or driving chains, all of which are less reliable in terms of mechanical stability and which may be blocked by the handled crops and hence, a lower down time is achieved.

Packer Mode and Packer Trajectory

With reference to FIGS. 2 to 9, the operation of the feeding means in packer mode is now explained in more detail. We will refer to the different stages of the packer operation by reference to the angle θ between the fixed strut 64 and the spacer rod 62.

Figure 2:
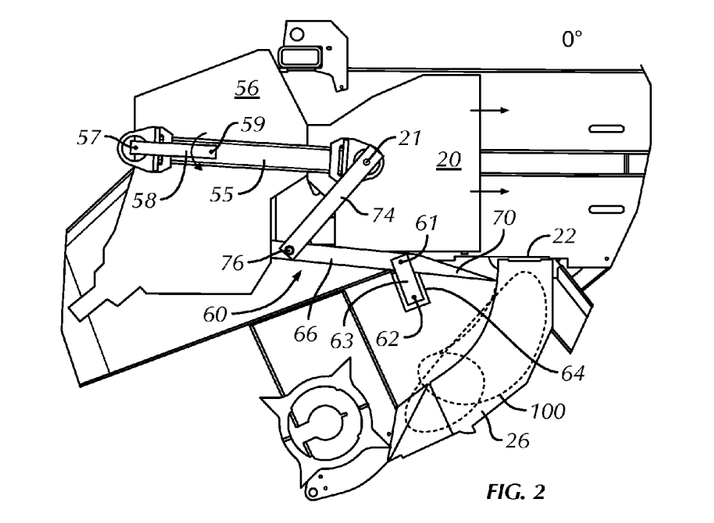
FIGS. 2 to 9 are enlarged views of the feeder means in different operating positions of a packer operating mode.

FIG. 2 shows the feeder means in a configuration θ=0°, in which the feeder tines 70 are completely retracted and positioned outside the feeder duct 26 near the inlet of the baling chamber 22 in their upmost position. The feeder tines 70 are retracted from the feeder duct, such that no significant load is applied to the feeding unit members (74, 66, 63) and hence to the pivot points and fulcra (21, 76, 61, 62). The plunger 20 is at its rearmost position and the inlet of the baling chamber is open.

Figure 3:
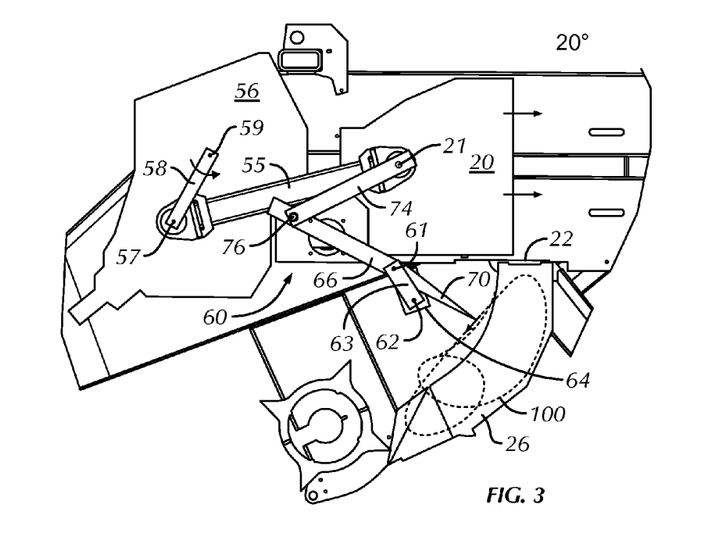
Figure 4:
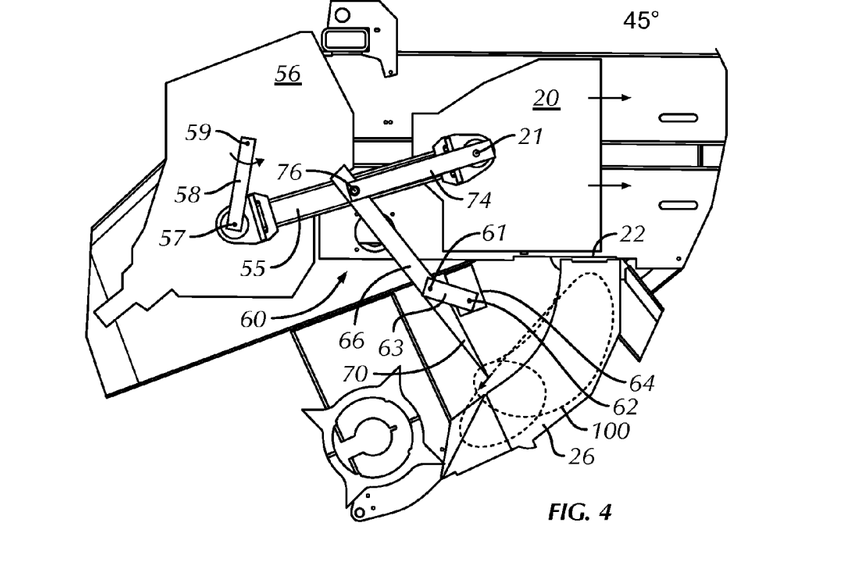

FIGS. 3 and 4 show the feeder means in a configuration of θ=20° and 45° respectively in which the fork tines 70 are still positioned outside the duct 26, but have begun to move downwards following a kidney-shaped trajectory 100. The plunger 20 has begun moving forwards.

Figure 5:
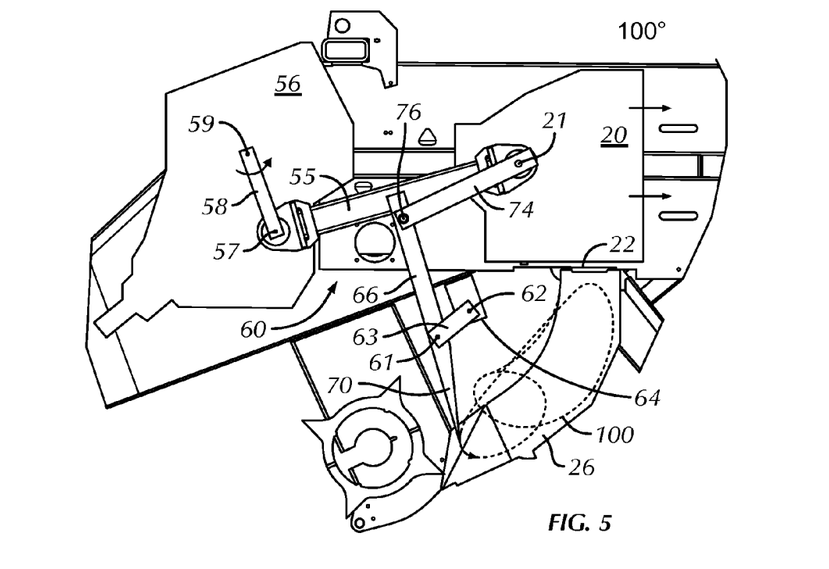

When the spacer rod 63 has rotated in a counter clock-wise direction to an angle θ=100° by the forward movement of the plunger 20 to a position as is illustrated in FIG. 5, the crank 74 is pulled forwards and the feeder fork 66 is pivoted backwards on its fulcrum 61 and downwards, such that the tines 70 are at their most backward position, entering the feeder duct 26 through the lower wall of the feeder duct 36 near the lower receiving end 30 of the feeder duct 26.

Figure 6:
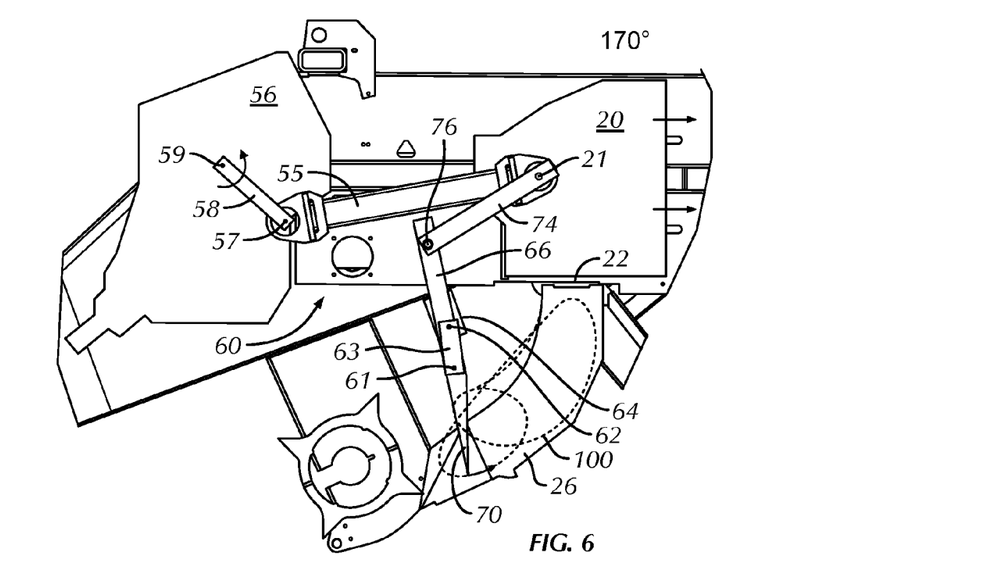

When the plunger 20 is moved further forwards, the spacer rod 63 is rotated in a counter clock-wise direction to an angle θ=170° by the forward movement of the plunger to a position as is illustrated in FIG. 6, the crank 74 is pulled forwards and the feeder fork 66 is pivoted backwards on its fulcrum 61 and downwards, such that the tines 70 now enter the feeder duct 26 through the slots in the bottom wall 36 near the lower receiving end 30 of the feeder duct 26, whereby the feeder tines 70 travel forwardly and downwardly along a portion of the path 100.

Figure 7:
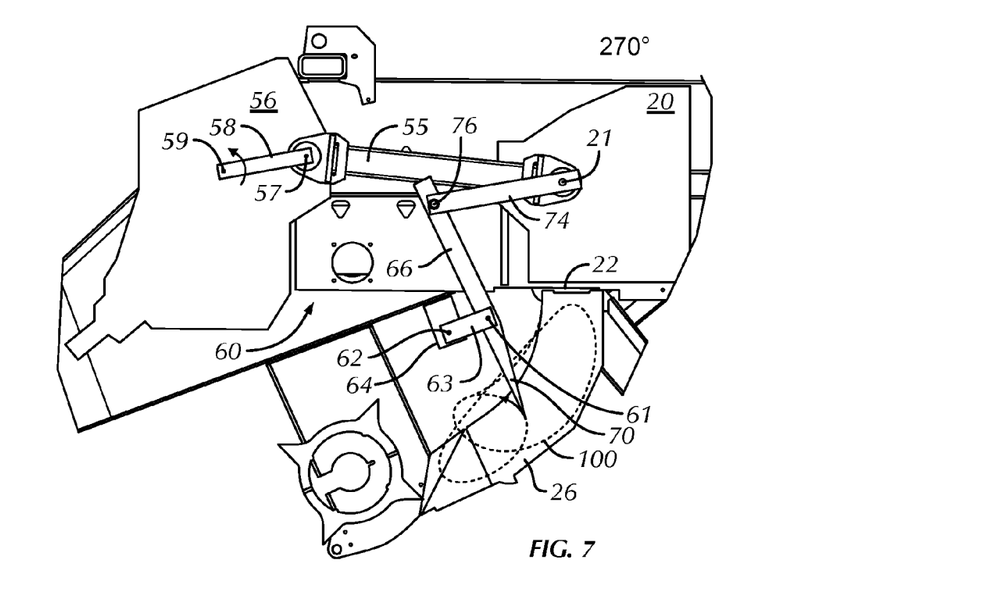
Figure 8:
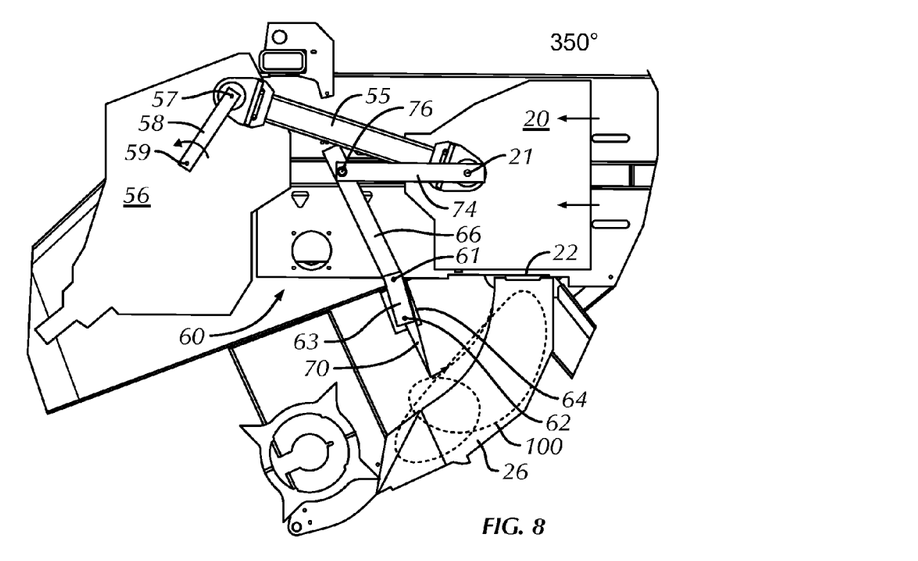
Figure 9:
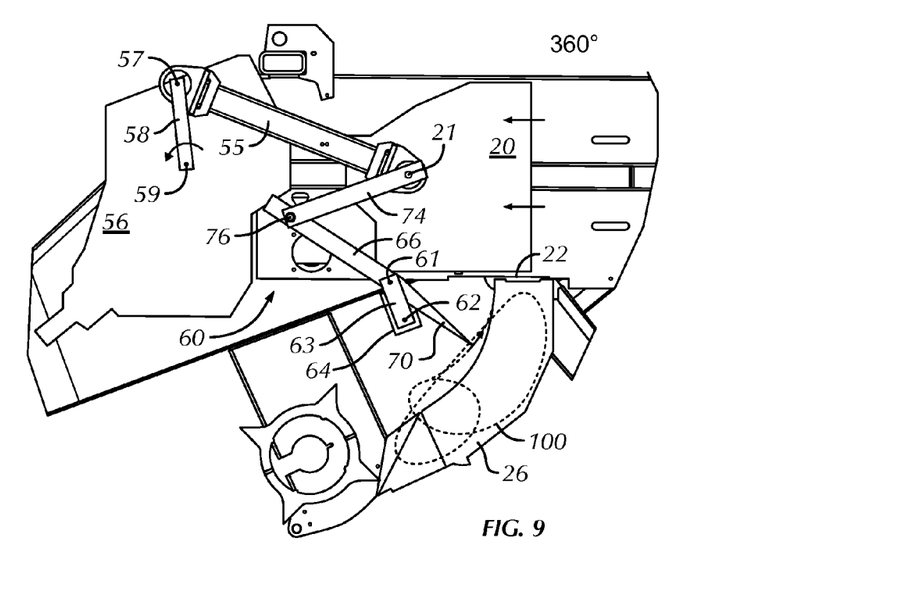
Figure 10:
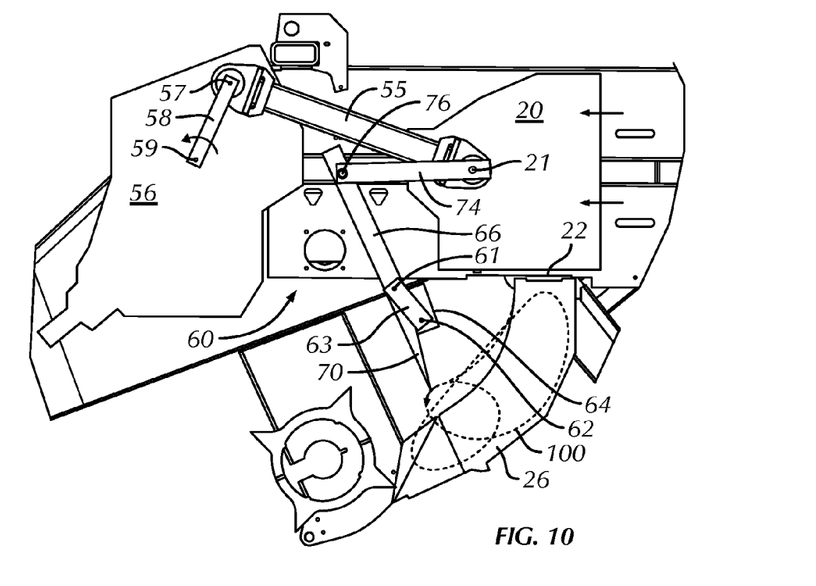
Figure 11:
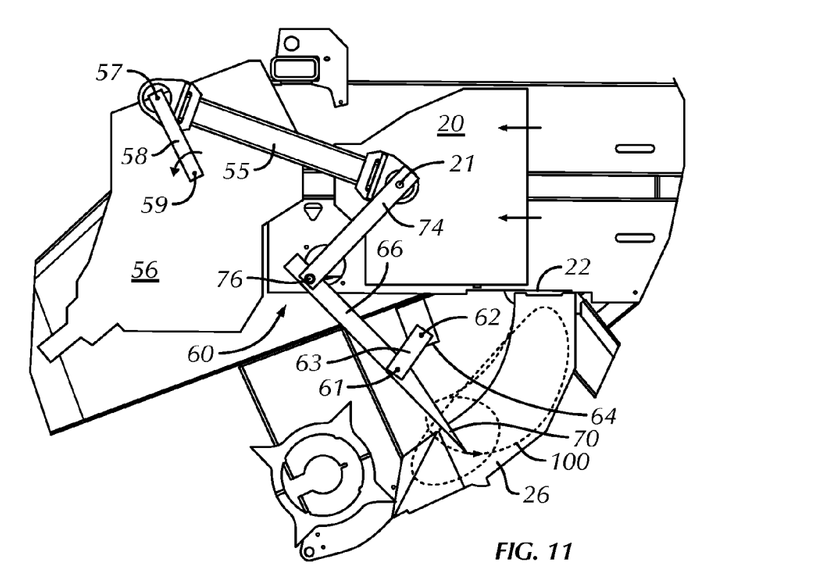
FIGS. 11 to 13 are enlarged views of the feeder means in different operating positions of a stuffer operating mode.
Figure 12:
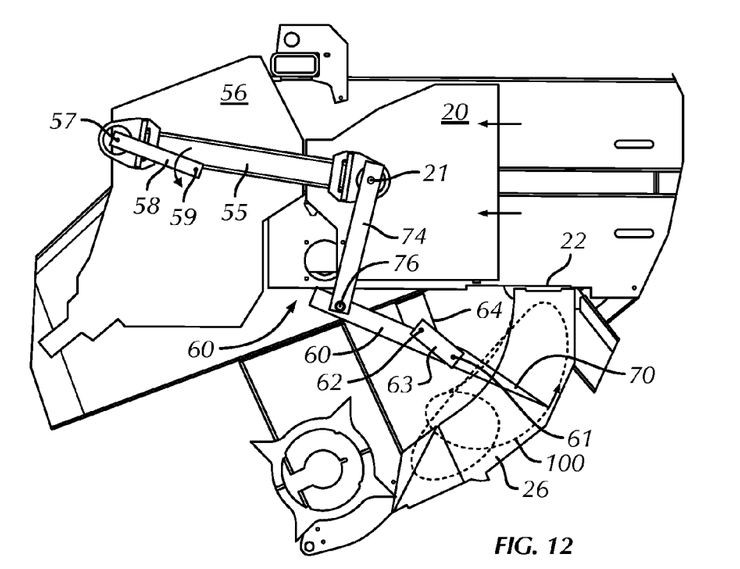
Figure 13:
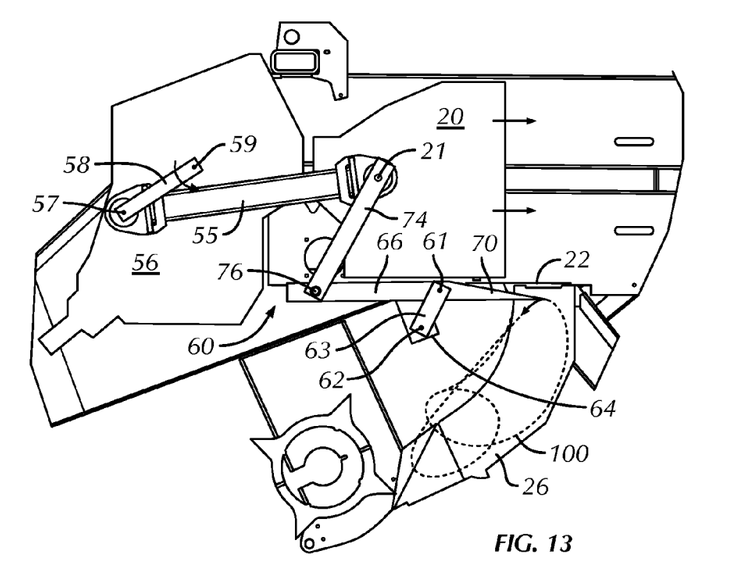

In FIG. 7, the plunger 20 has moved to its most forward position and the feeder tines 70 have now described half of their trajectory. Upon further (backward) movement, the feeder tines 70 are retracted from the feeder duct 26. When the spacer rod 63 has completed a 360° rotation (FIG. 9), the spacer rod 63 is blocked in its latter position, for example by a one-turn clutch mechanism, and upon further backward movement of the plunger 20, the tines 70 are brought back into their original position (FIG. 2). Hence, one single back-and-forth stroke of the plunger effects a single sweep of the fork tines at the lower end of the feeder duct. Said trajectory is called the packer trajectory. The movement of the feeder tines 70, as described above, effects an accumulation of a charge of crop material in the feeder duct 26 (packer mode).

Hence, the packer trajectory consists of two parts, a packer stroke, designated P, with a duration of half of the reciprocating movement of the plunger, and a rest stroke, designated R, with a duration of half of the reciprocating movement of the plunger. Hence, in packer mode, the packer trajectory may be represented as a time sequence of iterating strokes PR.

Stuffer Mode and Stuffer Trajectory

The feeder tines 70 may also describe a stuffer trajectory which brings the feeder tines 70 in the upper area of the feeder duct 26 in front of the inlet of the baling chamber 22 to stuff the charge of crop material from said feeder duct 26 into the baling chamber 22 (stuffer mode).

Starting from the same position as in FIG. 2, the spacer rod 63 performs the same rotation over 360° as shown in FIGS. 2 to 9. However, when the spacer rod 63 is not blocked after a first rotation of 360°, it continues a second full 360° rotation around its pivot point 62, moving the feeder tines 70 along a second kidney-shaped path through the feeder duct 26, as is shown in FIGS. 10 to 13. The feeder tines 70 enter the upper wall of the feeder duct 32 at an entrance point higher up in the feeder duct 26 and make a sweep such that the feeder tines 70 are in close proximity to the inlet of baling chamber 22. The movement of the feeder tines 70 is timed such that the plunger 20 has cleared the inlet opening of the baling chamber 22 when the feeder tines 70 start to move upwards in the feeder duct 26, pushing the charge of crop material upwardly and the charge of crop material can be transported by the feeder tines 70 from said feeder duct 26 into the baling chamber 10. After the feeder tines 70 have pushed the charge of crop material into the inlet of the baling chamber 22, the feeder tines 70 are retracted in position a substantially horizontal to the floor of the baling chamber 24. At this point, the cycle is completed and the feeder tines 70 are back at their original position.

The movement of the feeder tines 70 is synchronized with the reciprocating plunger 20 such that the feeder tines 70 are in their most upward position when the plunger is fully retracted.

Hence, the stuffer trajectory consists of two parts, a packer stroke, designated P, with a duration of half of the reciprocating movement of the plunger, and a stuffer stroke, designated S, with a duration of half of the reciprocating movement of the plunger. Hence, in stuffer mode, the stuffer trajectory may be represented as a time sequence of iterating strokes PS.

Switch-Over

Both feeder trajectories, the packer and stuffer trajectories, may be combined and iterated at will and the combinations and iterations will depend, among others, on the rate of accumulation of crop material in the feeder duct, the nature of the crop material, etc. For example, the feeder means according to the invention may describe successively four packer trajectories PR and one stuffer trajectory PS, designated PRPRPRPRPS.

The switch-over from packer to stuffer trajectory is controlled by the relative rotational position of the spacer rod 63, as explained above, relative to the baler frame 25, in particular the strut 64. An elegant way to implement such switch-over is the design of the spacer rod 63 as single revolution clutch assembly, as disclosed in U.S. Pat. No. 5,937,746 (1999, New Holland North America, Inc.) for a knotter apparatus on an agricultural baler. According to this invention, the single revolution clutch may be triggered by a sensor mechanism, in particular a trip sensor 37 in the feeder duct 26, of which the sensitivity can be adjusted—when the precompression chamber has received a predetermined amount of material—to optimize the baling process based on crop intake data, for example received from a pressure sensor 37 in the feeder duct 26.

The feeder means according to the invention has the advantage that the feeder tines will leave the upper end of the feeder duct faster than in the baler according to the prior art. Hence, there is less change of interference with the incoming crop. Furthermore, the feeder system according to the invention has the advantage that the tines will enter lower into the lower end of the feeder closer to the crop receiving mouth than in the baler according to the prior art. If augers 44 have been mounted, more crop can be taken away just after the augers, so less crop build-up is possible and there is less change to block the feeder mechanism.

Figure 14A:
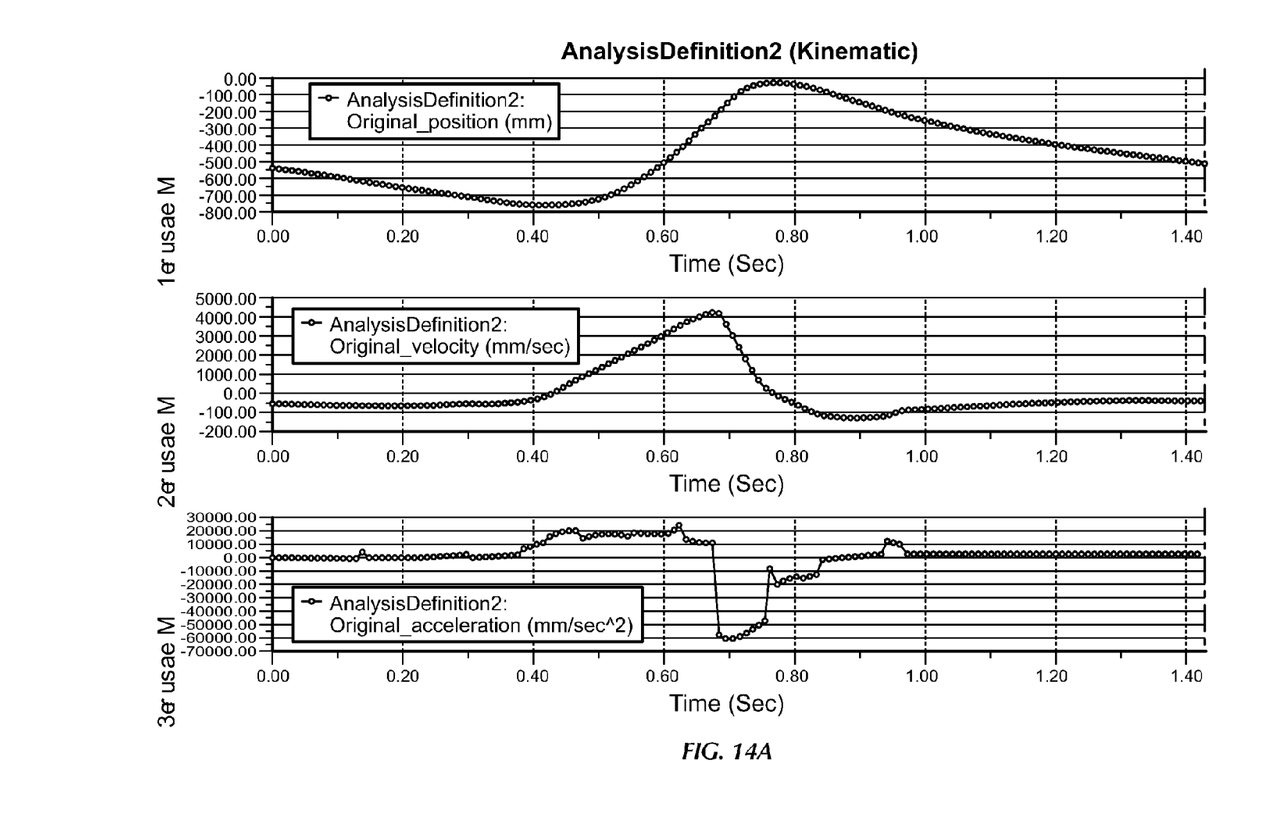
Figure 14B:
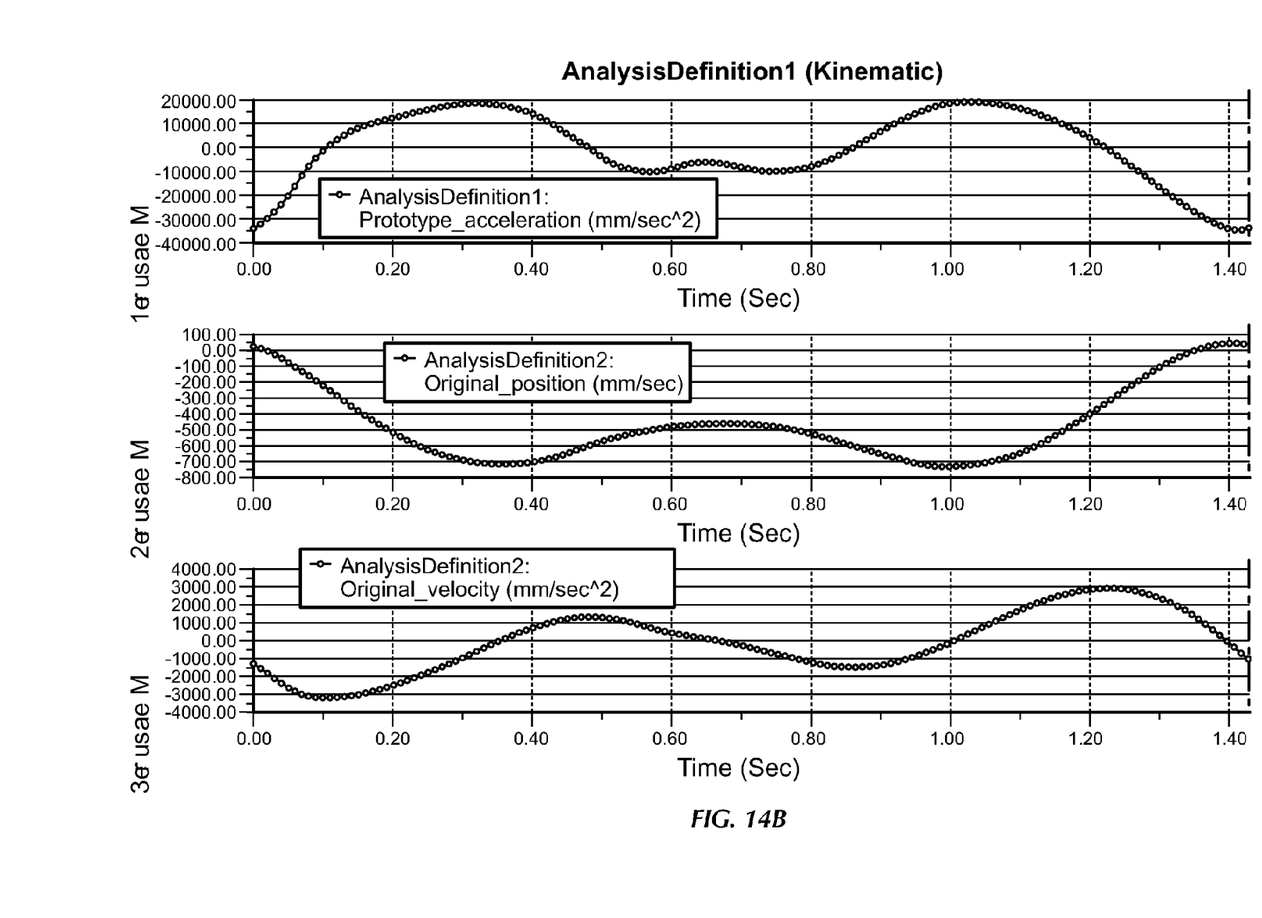

FIG. 14 shows the position, speed and acceleration courses of the feeder system from the prior art (FIG. 14a, similar to EP 0 636 308 B1, FIG. 15) and the feeder system according to the invention (FIG. 14b). As can be seen, the prior art feeder means exhibit a large deceleration at about 0.7 seconds in the feeder trajectory at the end of the stuffer stroke. The feeder means according to the invention exhibit no such large deceleration.

It can be appreciated that the present invention provides a very effective solution to the problems of the prior art balers described in the introduction of this specification.

The invention claimed is:

1. An agriculture baler of a rectangular type comprising:
a wheeled frame;
a baling chamber mounted to said frame and extending generally fore-and-aft with respect to an intended direction of movement of the baler and having an inlet opening in a lower wall thereof;
a compressor mounted for reciprocation within the baling chamber over the inlet opening for compressing successive charges of crop material fed through said inlet opening into said baling chamber to form a bale thereof;
a feeder duct communicating at one end with the inlet opening in the baling chamber and curving downwardly and forwardly there from and terminating in a lower, forwardly facing open crop receiving mouth; this feeder duct comprising upper and lower curved walls of which the upper wall comprises slots, extending generally from said crop receiving mouth to said inlet opening in the baling chamber for cooperation with feeder tines;
a feeder comprising a feeder fork with feeder tines, wherein the feeder is configured to move the feeder tines along two distinct trajectories, a packing trajectory for accumulating a charge of said crop material in the feeder duct, and a stuffing trajectory for stuffing said charge of said crop material into the baling chamber, wherein:
the movement of the feeder is directly derived from and synchronized with the movement of the reciprocating compressor through a linkage spanning between the feeder fork and a pivot point where a pitman arm attached to the compressor, and
the feeder fork comprising at a first rearmost end for cooperating with the feeder duct a series of laterally spaced-apart elongated feeder tines, and at a second rearmost end is rotably attached to the linkage, the linkage comprising a pair of cranks connected through pivots, and wherein the fulcrum of the feeder fork is rotably coupled to a first end of a spacer rod and the spacer rod is rotably coupled at a pivot point at a second rearmost end to the wheeled frame.

2. Agricultural baler according to claim 1, wherein the linkage is pivotally attached either to the pivot point of the pitman arm or to a pivot point on the reciprocating compressor other than the pivot point of the pitman arm.

3. Agricultural baler according to claim 1, wherein the position of the feeder tines relative to the feeder duct is determined by the relative positions of the crank, feeder fork and spacer rod, operably connected through pivots and fulcrum.

4. Agricultural baler according to claim 1, wherein the feeder tines may describe a trajectory in and outside the feeder duct which is partly at the lower end in the feeder duct, the packer trajectory, or partly at the upper end in the feeder duct, the stuffer trajectory.

5. Agricultural baler according to claim 4, wherein the packer trajectory has two parts, a packer stroke with a duration of half of the reciprocating movement of the compressor, and a rest stroke with a duration of half of the reciprocating movement of the reciprocating compressor.

6. Agricultural baler according to claim 4, wherein the stuffer trajectory consists of two parts, a packer stroke with a duration of half of the reciprocating movement of the compressor, and a steer stroke with a duration of half of the reciprocating movement of the reciprocating compressor.

7. An agricultural baler according to claim 5, wherein the switch-over from packer to stuffer trajectory is controlled by the relative rotational position of the spacer rod.

8. Agricultural baler according to claim 1, wherein the spacer rod is configured as a single revolution clutch assembly.

9. Agricultural baler according to claim 1, wherein a clutch may be triggered by a trip sensor in the feeder duct.

10. The agricultural baler according to claim 1, wherein the spacer rod is ratably coupled in the pivot point at the second rearmost end to the frame such that a position of pivot point is fixed relative to the feeder fork.

11. The agricultural baler according to claim 1, wherein the compressor is a plunger and the cranks are pivotally attached to the plunger such that the movement of the feeder is only derived from the movement of the plunger.

12. The agricultural baler according to claim 1, wherein the pivotally connected cranks are arranged to place the compressor in driving connection with the feeder fork.

* * * * *